United States Patent [19]

Wesley

[11] 4,292,841
[45] Oct. 6, 1981

[54] COMPRESSION RATE ANALYZER
[75] Inventor: William M. Wesley, Kildeer, Ill.
[73] Assignee: Creative Tool Company, Lyons, Ill.
[21] Appl. No.: 56,501
[22] Filed: Jul. 11, 1979
[51] Int. Cl.³ ............................................ G01M 15/00
[52] U.S. Cl. .................................... 73/119 A; 73/115
[58] Field of Search ................ 73/116, 117.3, 35, 714, 73/115, 119 A

[56] References Cited
U.S. PATENT DOCUMENTS
3,183,708  5/1965  Roddick ................................... 73/35
4,141,242  2/1979  Scott ............................. 73/119 A X Primary Examiner—Jerry W. Myracle
Attorney, Agent, or Firm—Neuman, Williams, Anderson & Olson

[57] ABSTRACT

A system and method for monitoring the performance and condition of various cylinder components of internal combustion engines through the provision of a transducer for detecting the time-rate-of-change of pressure within the cylinder during normal operation of the engine and a circuit for processing and quantizing the transducer signal to develop a numerical indication of pressure changes within the cylinders. The system also includes a tachometer circuit and display apparatus as well as an optional memory and processor to facilitate a comparative analysis of the various cylinders at varying speeds.

27 Claims, 6 Drawing Figures

COMPRESSION RATE ANALYZER

FIELD OF THE INVENTION

This invention is related generally to engine diagnostic equipment and more particularly to systems that analyze the condition and operation of internal engine components.

BACKGROUND OF THE INVENTION

Mechanics and diagnosticians of internal combustion engines have for many years used compression gauges in analyzing the condition and operation of cylinders, pistons and valves. Typically, compression gauges are of the manifold type and are pressed into the engine's spark plug aperture after the plug is removed, or in the case of diesel engines, into the injector-nozzle port after the injector nozzle is removed. Pressure from within the cylinder is then measured by cranking the engine and monitoring the pressure build-up on a needle gauge. In compression testing in the case of diesel engines, the injector pump is normally disabled during compression testing to avoid combustion with a nozzle removed. Similarly, the distributor is disabled during compression testing of carbureted engines to avoid combustion when the spark plug is removed. In either case, compression readings can only be safely taken at cranking speed.

While the pressure reading taken from an individual cylinder is of some value, it is generally recognized as an unreliable indicator of engine performance, particularly in simple compression gauges used in the field and by the consumer. More accurate and meaningful diagnosis normally requires that the ratings from all of the cylinders of the engine be read sequentially and compared to each other. Any reading lower than the norm by more than 10 or 20% is an indication of a malfunction within the cylinder, the malfunction normally being attributed to either worn or broken rings or to bad or broken valves.

It will be appreciated that analysis of the engine's performance with conventional compression gauges has several limitations. First, diagnosis in this manner requires removal of the plug from the cylinder, or in a diesel, the removal of the injector nozzle. This may be a very cumbersome, time-consuming task. Second, compression measured in this manner is static in nature and does not reflect the operation of the cylinder during regular operating conditions. Some engine faults cannot be detected from the compression readings during static conditions since they manifest themselves only during normal running of the engine and, in some instances, only when the engine is operating at high RPM. And obviously diagnosis with a compression gauge tells the user nothing about the condition of injector nozzles in a diesel engine if the nozzle must be removed during insertion of the gauge. Similarly, conventional compression testing reveals nothing with respect to the performance of spark plugs in a carbureted engine.

It has also been proposed that apparatus be provided for monitoring on a storage oscilloscope the pressure-related signals from multiple piezoelectric transducers of the type shown in Dooley U.S. Pat. No. 4,036,050.

SUMMARY OF THE INVENTION

The present invention is designed to overcome the drawbacks and deficiencies of the aforesaid diagnostic testing apparatus. Specifically, the invention provides information relative to the performance of each cylinder at actual operating speeds as well as cranking speed and does not require the removal of the spark plug or the injector nozzle. As such, it reduces the time and labor needed for engine diagnosis. The apparatus of the present invention is inexpensive to manufacture and to operate, making it adaptable to a wide variety of diagnostic environments, including the laboratory, the service garage and the field. In particular, the apparatus and methods of the present invention have proven particularly useful in the diagnosis of fuel system and injector nozzle faults in diesel engines. Faulty injector nozzles and pumps are a major contribution to improper or incomplete combustion in diesel engines and the ability to detect these faulty components makes possible more powerful, more fuel efficient and cleaner running diesels.

Specifically, it has been discovered that the electrical signals developed when certain piezoelectric transducers are coupled to an internal combustion engine vary in accordance with the time-rate-of-change, or first derivative, of the actual pressure within the cylinder being monitored. For example, the Creative Tool Company injector nozzle transducers disclosed in Dooley, et al. U.S. Pat. No. 4,036,050, and the glow plug and spark plug type transducers disclosed in Dooley, et al. patent application Ser. Nos. 960,590 now abandoned and 960,600 (filed Nov. 14, 1978) now U.S. Pat. No. 4,227,402 each produce a signal that varies in accordance with the time-rate-of-change of pressure developed within the cylinder being monitored. For ease of description this signal, representing the first derivative of actual cylinder pressure, is hereafter called the "compression rate" signal.

It has been additionally discovered that various faults within the cylinders are reflected in the compression rate signal in a manner which can be detected through certain processing circuit apparatus with numerical readouts and methods of analysis. To this end the system includes circuitry for quantizing the maximum magnitude of the transducer output signal by measuring that signal amplitude and producing a numerically coded value corresponding to that amplitude.

In particular, the consistency of readings of the quantized compression rate taken from the various cylinders is of importance. For example, a completely inoperative injector nozzle creates a substantial reduction from the norm in the quantized transducer output signal for the corresponding cylinder. Similarly, the existence of an open or "bleeding" nozzle creates a variation in the quantized transducer signal on the associated cylinder of approximately 20–30%. A malfunctioning exhaust valve creates a reduction in the quantized compression rate signal for that cylinder to an even greater extent. Similarly, broken rings within the cylinder drastically reduce the quantized compression rate signal developed by the transducer, particularly at low RPM, in view of the fact that blow-by around the cylinder dampens the rate at which pressure increases during the power stroke.

It has also been recognized that the time-rate-of-change, or first derivative, of pressure increases with engine speed due to the fact that the piston is compressing air faster within the cylinder as speed increases. Therefore, for various fault diagnoses, the quantized compression rate readings monitored for the various cylinders must be referenced to engine speed for an accurate comparison. To this end, the apparatus of the present invention includes means for monitoring engine speed and displaying that speed through the use of many of the same components that are also used for processing the compression rate signal. In order to allow the operator to record the necessary information, means are provided for temporarily holding the maximum value of the compression rate signal for reading by the operator or storage, as the case may be, and for rapidly clearing that value from the operator's readout as desired. As an additional and optional feature of the invention, means are provided for electronically storing in a memory for later recall the maximum value of the pressure time-rate-of-change for each of the cylinders. Through this means, the compression rate for each of the cylinders can be monitored at a given engine speed, 1,000 RPM for example, and then recalled for sequential display to the operator or others at a later time. The memory may be an analog or capacitive memory in inexpensive variations of the invention, or, in a factory diagnostic system, the memory may be a part of a microprocessor which records the data from each of the engine cylinders for later use in diagnostic or warranty purposes. The use of a microprocessor makes possible the storage of compression rate numbers for the various speeds of each cylinder and facilitates the automatic comparison of these numbers on an instantaneous basis to signal deviations from the norm in given cylinders. Outputs from the processor may be in the form of printed graphs of the compression rate curves for each cylinder or of the ratios of compression rates to each other for a given cylinder at various speeds. By comparing the compression rates or curves from the various cylinders to each other, the microprocessor may alternatively be used to print out or otherwise display deviations from the norm for each cylinder or, in less sophisticated environments to provide a fault indication (a light, buzzer or the like) to the operator whenever the compression rate for a given cylinder deviates from the norm by more than a predetermined amount.

Various methods for using the apparatus of the present invention to its maximum effectiveness have been developed. For diagnosis of a diesel or other fuel-injected engine, for example, the operator may first monitor the compression rate of all the cylinders at the same predetermined engine speed. If the readings taken from any of the cylinders falls outside of the normal band of variation (typically 0 to 15%) an additional reading on the inconsistent cylinder may be taken with the fuel line disconnected. If the readings taken at the same speed before and after the fuel line is disconnected do not significantly differ, it can be inferred with substantial accuracy that the fuel injection system for that particular cylinder, and typically the injector nozzle assembly, is malfunctioning at that speed.

Often the malfunctioning nozzle will malfunction only within a portion of the speed range. Accordingly, the method of the previous paragraph is typically applied at speeds in the low, mid and high range. On various engines and transducers the compression rate signal will vary from cylinder to cylinder due to mechanical inconsistencies between the nozzles or glow plugs to which the transducer may be attached. An alternate method of diagnosis for this situation is disclosed which provides for a comparison between the compression rate signals with and without the fuel lines connected and at varying speeds to develop ratios which signal faulty cylinders without regard to transducer idiosyncrasies. Various alternative and additional methods of using the apparatus of the present invention are set forth below.

Other objects and advantages of the present invention will become apparent upon a reading of the following detailed specification and upon reference to the drawings of the preferred embodiments.

While the invention will be described with certain preferred embodiments and methods for using those embodiments, it will be understood that I do not intend to limit the invention to those embodiments and procedures. On the contrary, I intend to cover all alternatives, modifications and equivalents as may be included within the spirit and scope of the invention as defined by the appended claims.

DESCRIPTION OF THE PREFERRED EMBODIMENTS

Figure 1:
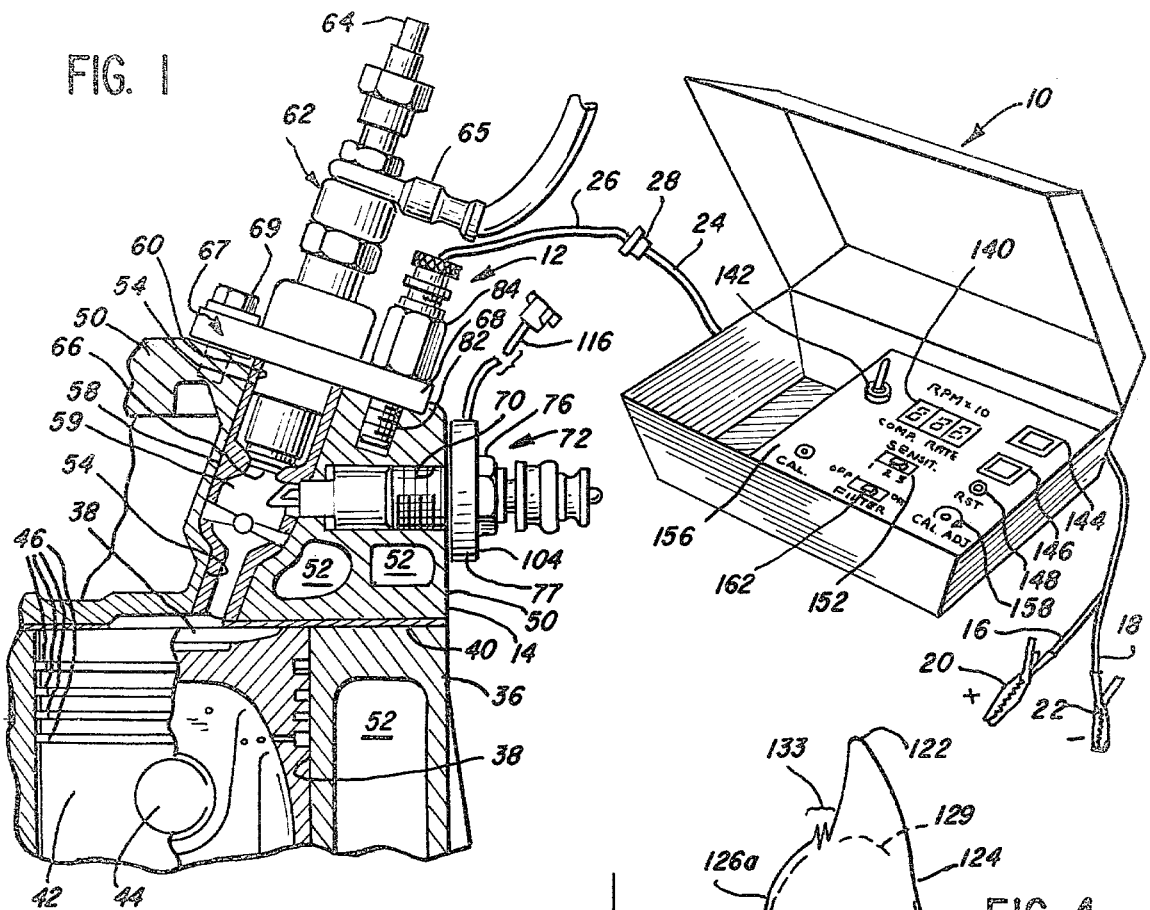
FIG. 1 shows the preferred embodiment of the compression rate analyzer of the present invention coupled to the cylinder of an engine by way of one of a pair of alternate transducers depicted.

Turning first to FIG. 1, there is shown a compression rate analyzer 10 constructed in accordance with the present invention and operating in conjunction with a transducer assembly 12 coupled to the injector nozzle of a fuel-injected engine 14. The compression rate analyzer 10 receives its power from a pair of input leads 16 and 18 designated plus (+) and minus (−) respectively. Each of the power leads has an alligator clip 20, 22 for connection to the terminals of a 12 or 24 volt battery typically found in all mobile equipment. The input signal to the compression rate analyzer 10 is received on a two terminal input line typically in the form of a coaxial cable 24 which is coupled to an output line 26 of the coaxial type from the transducer assembly 12 via a suitable BNC connector 28.

Before describing the compression rate analyzer in detail, it is noted that the engine 14 is depicted in a fragmentary cut-away form to expose the operative components for one cylinder of a diesel engine, although the apparatus and method of the present invention are equally applicable to non-diesel or carbureted engines in a manner to be hereinafter described. The engine 14 includes a block assembly 36 having a plurality of cylinders 38 formed therein and extending vertically to the top of the block 40. Travelling within the cylinder 38 is the piston assembly 42 which is coupled to the crankshaft via a connecting rod mating at a pivot point 44. The piston 42 has a series of circumferential rings 46 for compression and lubrication in the usual manner.

Coupled to the top of the engine block 36 is the compression head assembly 50 which has a plurality of interconnected passages 52 for the passage of coolant throughout the head. Also included in the compression head 50 is a first port 54 which extends from the top of the head to the bottom of the head into proximity with the cylinder 38 of the block. The port 54 is channel-shaped and encompasses a sleeve portion 58 into which a chamber 59, typically called a precombustion or "swirl" chamber, is formed. At the upper end of the port 54 is an entranceway 60 adapted to receive a fuel injector nozzle assembly 62 for introducing fuel into the precombustion chamber 59 and thereafter into the cylinder 38 when the fuel delivered thereto via a fuel distribution line 64 exceeds a predetermined pressure. In addition to the fuel supply line 64, the nozzle assembly 62 includes an overflow bleed fitting 65 and a forward injector orifice 66 which is seated at the lower end of the nozzle assembly 62 against the entrance to the precombustion chamber 59.

The nozzle assembly also includes a pair of integral flange portions 67 and 68 which project outwardly and have holes formed therein for receiving suitable fasteners such as the bolt 69 which secure the flanges against the outer surface of the compression head against forces from within the cylinder tending to eject the entire nozzle assembly from the port 54. As will be described more fully below, one of the flanges 67 or 68 may alternately be secured by a transducer assembly of the cap-screw type for developing the "compression rate" signal in response to forces acting axially on the nozzle assembly 62 from within the cylinder.

Also included within the compression head 50 is a second port or channel 70 extending into the precombustion chamber 59 from the side of the block. The port or aperture 70 is provided for the purpose of securing a glow plug 72 of the type typically provided in diesel engines for preheating the precombustion chamber to assist the ignition during cold start-ups. The glow plug 72 is threaded into the aperture 70 by applying torque to a hexagonal bolt-like portion 76 which extends in circumference beyond the threaded portion of the plug 72. Underlying the hexagonal portion 76 is a piezoelectric transducer 77 of the type shown in more detail in FIG. 3. The transducer 77 develops a compression rate signal in response to forces acting upon the glow plug 72 from within the cylinder.

The compression rate analyzer 10 and the various diagnostic methods of the present invention may be utilized with any of a group of transducers marketed by Creative Tool Company for developing signals in response to pressure variations within the cylinders of internal combustion engines that act internally upon various combustion-aiding components extending to the outside of the engine, such as injector nozzles, glow plugs or spark plugs. While two of these transducers will be described in some detail below, it is noted that the present invention may incorporate the use of any of the nozzle attachment transducers disclosed in Dooley, et al. U.S. Pat. Nos. 4,036,050 and 4,109,518. In addition, the system of the present invention may incorporate a glow plug or spark plug replacement transducer of the type disclosed in the Dooley, et al. U.S. application Ser. No. 960,600 filed Nov. 14, 1978.

The common feature of each of the transducers noted above and described in this application is the presence of a piezoelectric element which is normally held in compression within a housing and subjected to changes in stress or force waves resulting from pressure variations within the cylinder of the engine. Two of these transducers are shown generally in FIG. 1 and in detail in FIGS. 2 and 3.

The bolt type transducer 12, as noted above and as shown in FIG. 1, is adapted to replace one of the bolts or fasteners which holds the flange elements 67 and 68 of the nozzle 62 against the compression head. Pressures tending to unseat the nozzle 62 from its aperture 54 thus are detected by the transducer 12 and an output signal on the line 26 results. As shown in more detail in FIG. 3, the transducer 12 has a unitary housing 80 consisting of a lower shank portion 82 and an expanded upper portion 84. The lower portion 82 extends through an aperture 85 of the nozzle flange 68 and into a threaded hole 86 formed in the compression head 50. The shank portion 80 is kept short so that it does not seat against the inner end of the hole 86, thus allowing the upper portion 84 to seat against the flange 68 and hold it in compression.

The upper portion 84 has an outer surface which is hexagonal in shape so as to facilitate insertion and removal of the transducer assembly by a wrench. A cylindrical hole 87 extends into the upper portion 84 and has a flat inner face 88 which lies in a plane which is parallel and in close proximity to the plane on which the upper housing portion 84 seats against the flange 68. A disc 89 of piezoelectric material is bonded to the inner face 88 of the hole 82 by an electrically conductive epoxy. The opposite or outer face of the piezoelectric disc 89 is held in compression by a compressible plug 90 which, in turn, is compressed by a BNC type coaxial fitting 91 threaded into the hole 87 at its upper end. The compressible plug 90 has an inner portion 92 of electrically conductive rubber and an outer sleeve 93 of electrically insulating rubber. The insulating rubber 93 is preferably of the heat shrinkable type to facilitate manufacture of the compressible plug 90 while creating a tight fit of the sheath 93 around the conductive plug 92. As thus constructed, the compressible plug 90 serves the dual functions of maintaining the piezoelectric disc 89 under compression and transferring the electrical output signal from the disc to the coaxial fitting 91.

The fitting 91 is a commercially available BNC type device having an inner center shaft 94 of conductive metal which is sharpened at its lower end for penetration into the conductive rubber 92. Separating the inner conductor shaft 94 from the outer conductive shell of the fitting 91 is an insulator portion 95 of rigid material such as teflon or the like.

The crab bolt transducer 12 itself is the invention of others at Creative Tool and the details of construction are substantially set forth in the copending Dooley, et al. application Ser. No. 960,600 filed on Nov. 14, 1978. Other details of crab bolt transducers in general are set forth in the Dooley, et al. U.S. Pat. No. 4,036,050 issued on July 19, 1977.

Figure 2:
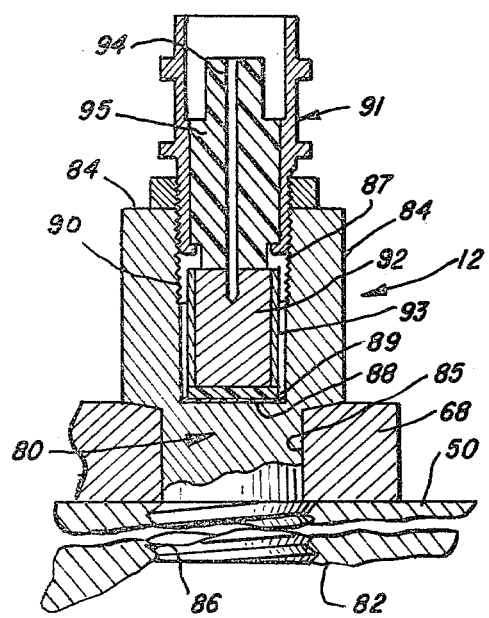
FIG. 2 is a partial cut-away view of the transducer assembly coupled to the injector nozzle shown in FIG. 1.
Figure 4:
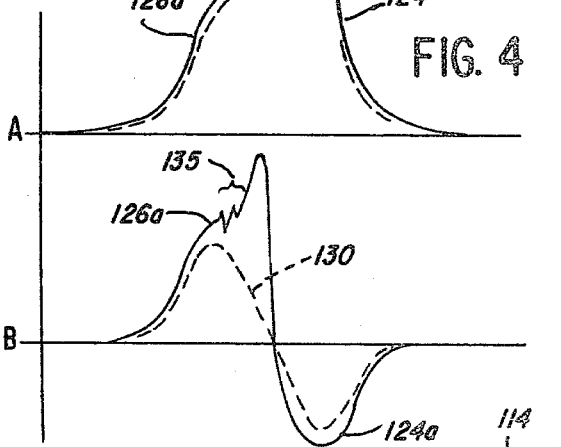
FIG. 4 is a pair of curves A and B, representing, respectively, the pressure-time relationship within the engine cylinder and a typical compression rate output signal from the transducers shown in FIGS. 1–3.

Coupled to the injector nozzle assembly in the manner shown in FIG. 1, the transducer assembly shown in FIG. 2 develops a signal corresponding to the curve designated "B" in FIG. 4. This signal will be described in detail below.

Figure 3:
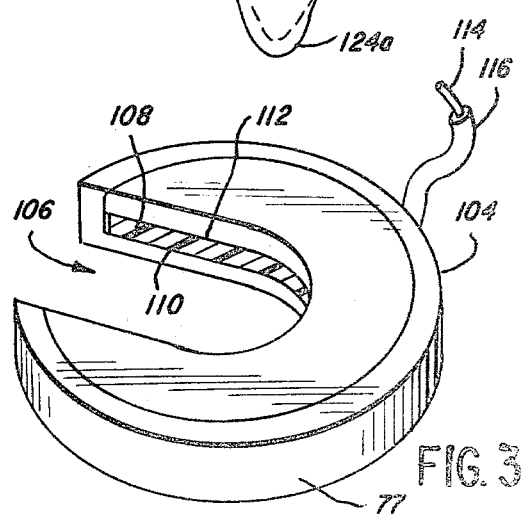
FIG. 3 is a perspective view of the transducer assembly coupled to the cylinder glow plug shown in FIG. 1.

FIG. 3 depicts an alternate transducer which is in the form of a U-shaped housing 104 having an opening 106 appropriately sized for insertion around the shank portion of the glow plug assembly 72 shown in FIG. 1. Like the transducer of FIG. 2, the U-shaped structure of FIG. 3 includes a piezoelectric element 108 having a lower surface 110 electrically coupled to the metal housing 104 by a conductive adhesive. An upper surface 112 of the piezoelectric slab 108 is insulated from the housing 104 so as to develop an electrical output signal on a conductor 114 in accordance with flexure of the slab 108 due to pressures exerted via the glow plug assembly. The transducer of FIG. 3, like the transducer of FIG. 2, produces its output signal on a coaxial-type cable which also includes an outer sheath 116 that is normally coupled in a suitable manner to the metallic housing 104 of the transducer assembly. A more detailed disclosure of the U-shaped transducer assembly of FIG. 3 is contained in the Dooley, et al. co-pending U.S. application Ser. No. 960,590 filed on Nov. 14, 1978.

As one aspect of the present invention, it has been discovered that the output signals developed by the various transducers disclosed above in FIGS. 1–3 and in the foregoing U.S. Pat. No. 4,036,050, and pending application Ser. No. 960,600 vary in accordance with the change of the pressure exerted within the cylinder. In other words, the signals from the transducers under normal operating conditions of the engine vary with the time-rate-of-change, or first derivative, of the pressure developed within the cylinder. This is shown graphically in FIG. 4, wherein curve "A" represents the variation of pressure within the cylinder during a single power stroke of the engine. As there noted, the pressure curve is of a bell-shaped configuration, represented by a solid line, the curve having a high frequency oscillation 120 (resulting from nozzle chatter during fuel injection) occurring shortly before the condition of top dead center of the piston within its cylinder. Thereafter the curve rises abruptly to a peak value indicating the firing pressure 122 created by combustion within the cylinder. The pressure within the cylinder thereafter falls at a maximum rate as noted at point 124 and eventually approaches an ambient value assymptotically at the end of the compression stroke. The output signal from the transducers of FIGS. 2 and 3 vary in the manner shown in trace b of FIG. 4. Curve B is effectively the first derivative of the pressure curve shown in curve A. For this reason, the signal of curve B increases rapidly to a point 126 corresponding to the maximum rate of change of the pressure curve shown in curve A and depicted at 126a of that curve. Thereafter the pressure within the cylinder increases at a slower rate and eventually stops increasing at the top dead center (TDC) condition, at which point the time rate of change of pressure is zero, although the actual pressure shown in FIG. A is at or near the peak pressure within the cylinder. Thereafter the output signal from the transducer changes polarity, reflecting that the rate of change of the pressure signal is actually negative, i.e., the pressure is decreasing within the cylinder rather than increasing. The maximum rate of decrease designated at point 124 on the pressure curve A of FIG. 4 creates the maximum or peak potential on the transducer output signal (curve B) as noted at the point 124a.

It is noted here that the crab bolt transducer 12, and in particular the piezo element 89, is compressed (flexed to a greater extent) during pressure increases within the cylinder, whereas the piezo element 108 on the plug transducer of FIG. 3 is relaxed during the same pressure increase. Both transducers are electrically grounded to the engine through their outer casings. To compensate for the fact that it is operating in a relaxation mode rather than a compression mode, the piezo element 108 of the transducer of FIG. 3 preferably has its positive face bonded to the metal ground housing 104 whereas the piezo element 89 of the transducer 12 has its negative face coupled to the housing. In other words, the piezo element 108 is electrically oriented in reverse to the element 89 with respect to the system ground potential so that the pressure increase within the cylinder creates a transducer signal that is of the same polarity as the first derivative of the pressure within the cylinder, i.e., positive with pressure increases and negative with pressure decreases. Although this uniformity of output signals is desirable, it will be appreciated that the invention described herein, for many purposes, will work equally well irrespective of the orientation of the piezo element with respect to ground and both orientations are within the scope of the present invention.

The curves A and B of FIG. 4 are for illustrative purposes only and are not intended to be either mathematically or functionally accurate in either coordinate. It will be appreciated that these curves and the parameters that they represent vary considerably from engine to engine and from transducer to transducer depending on engine type, displacement, timing, injector type, etc. However, the relationship of the transducer output signal to the actual pressure curve conforms substantially to a first derivative relation in each instance. In particular, the use of this signal has made possible analysis apparatus and techniques which are based on relative cylinder pressure levels rather than absolute cylinder pressure levels. The utility of the system is thus not destroyed by minor variations in the pressure or torque with which the transducer assemblies 12 and 77 are mounted to the engine. Although a certain minimum pressure or torque must be applied to properly place the transducers under stress by the engine components to which they are attached, minor variations in compression or torque beyond that minimum do not bear significantly on the utility of the output signal of the transducers for the comparative diagnostic system described herein. Stated somewhat differently, the diagnostic system of the present invention detects faults by analyzing the manner and rate at which pressure changes within the cylinder during operation of the engine rather than by analyzing only the actual or absolute pressures achieved within the cylinder.

The compression curve and transducer output signals A and B shown in FIG. 4 have superimposed thereon a broken line 129 and 130, respectively, which represents the pressure wave and time rate of change of the pressure curve, respectively, with the nozzle assembly inoperative. In this situation the pressure curve, denoted by the broken line 129 in curve A is a true bell-shaped curve as might be expected. The corresponding first derivative curve B is of a lower magnitude than the corresponding transducer signal with the fuel line or injector nozzle connected. This feature of the transducer output signals is significant in various of the methods of operation of the invention as described below, since the reduced transducer output signal obtained by disconnecting the nozzle or glow plug assembly, as the case may be, serves as a convenient reference or starting point for various diagnostic methods of significant value.

Returning now to FIG. 1 and the compression rate analyzer 10 itself, it is noted that the analyzer provides a digital read-out consisting of three digits of the light emitting diode (LED) type 140. In accordance with an important aspect of the present invention, the 3-digit readout 140 provides a dual function in that it supplies a tachometer or engine speed readout in one mode and a readout corresponding to the compression rate in another mode. For the purpose of choosing between the tachometer and compression rate modes, a two position switch 142 is provided which operates in conjunction with a pair of mode indicator lights 144 (for RPM×10) and 146 (for COMP. RATE). Since it is desirable that the digital readout 140 be able to accurately track changes in engine speed under dynamic conditions, the tach function operates in a manner which closely tracks the engine speed at all times. On the other hand, the compression rate indication is preferably maintained at a fixed level for a time period sufficient to allow the operator to record the information, regardless of the actual speed changes that may occur during the recording function. To this end, means are provided for temporarily storing the maximum compression rate number displayed on the indicator 140 even though the speed may be returned to the idle condition or zero. This allows the operator to record the necessary information corresponding to compression rate for a given speed without the necessity for maintaining that elevated speed during the recording operation. At the end of the recording operation, however, it is desirable to allow the compression rate number to be returned to a low quiescent value in readiness for measurement of the compression rate at the next engine speed level. To this end a reset button 148 is provided on the face panel and designated RST. The reset button is immediately below the compression rate mode indicator light 146 and is preferably of the same color to connote the functional relationship between these two components.

In order to accommodate the variation in transducer output signals which is obtained when various different types of transducers disclosed above are used, a variable gain amplifier is provided internal to the compression rate analyzer 10 as described below. For the purpose of providing the operator with a manual adjustment of the gain of the compression rate analyzer there is provided a slide switch 152 designated SENSITIVITY and having three positions, designated 1, 2 and 3, identified on the front panel. This front panel control of system gain in the compression rate mode allows the operator to initially choose a compression rate number for the transducer output signal which is within the range of the 3-digital display, namely between the numbers 0 and 999. Preferably the gain will be chosen such that the initial or idle condition creates a number approximately ¼ of the way through the range or of approximately 200 to 300 on the digital readout 140. Increased compression rates due to fuel combustion and increased speeds will thus normally be within the tracking capabilities of the three digit read-out. It is obviously important that the SENSITIVITY control be left undisturbed once it is initially set and throughout the entire testing procedure set forth below.

An additional pair of adjustments on the front panel are provided for periodically calibrating the tachometer function of the compression rate analyzer 10. The first of these controls consists of a calibration pushbutton 156 designated CAL., while the second consists of a calibration adjustment screw 158 designated CAL. ADJ. The depression of the calibration button 156, as noted below, connects a constant frequency oscillator to the input of the compression rate analyzer to provide a ready reference for the digital readout 140. Each unit of the compression rate analyzer will typically be initially calibrated in manufacture to a number which provides maximum accuracy during dynamic operation of the unit. Drifts due to changes in temperature, aging, etc., can be corrected by adjustment of the CAL. ADJ. knob 158 on the front panel.

Finally, it has been found desirable for some tests and diagnostic procedures to remove from the transducer output signals (curve B of FIG. 4) the high frequency component normally attributed to nozzle "spring chatter" occurring at the beginning of injection. This high frequency component, designated 133 and 135 respectively in FIG. 4, is typically in the range of 2,000 to 3,000 Hz. This frequency is well above the normal frequency of repetition of the compression rate signal in a conventional engine, which occurs nominally at frequencies below 200 Hz. In order to remove the high frequency component as well as other spurious signals due to engine vibration, etc. and thereby provide a more accurate indication of compression rate, an optional filter is provided in the compression rate analyzer 10 shown in FIG. 1. This filter is selectable on the control panel by a slide switch 162 having positions respectively designated ON or OFF.

Figure 5:
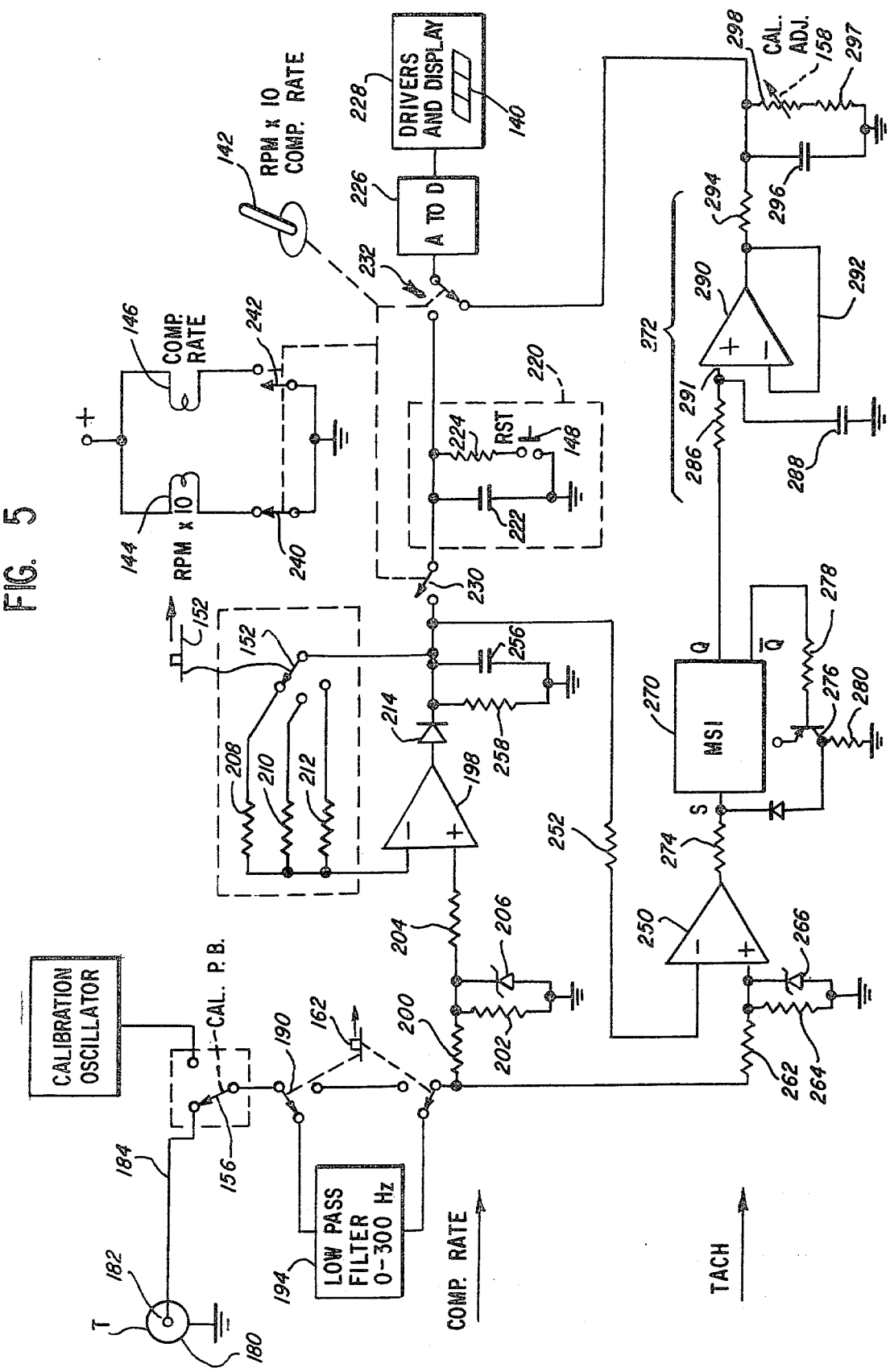
FIG. 5 is a detailed circuit diagram, partially in block form, illustrating the interconnection of the components internal to the compression rate analyzer shown in FIG. 1.

Turning now to the electrical circuit for the compression rate analyzer 10, there is shown in FIG. 5 a circuit which in general consists of upper and lower functional paths for performing the COMP. RATE function and the TACH. function respectively.

The input to the circuit, is provided by a transducer designated T in FIG. 5 which may be any of the various units described above. The transducer signal is normally delivered on a coaxial cable as noted above, one side of the piezoelectric element being coupled to the outer conductive sheath 180 of the cable, while the other side of the piezoelectric element is connected to the central conductor 182 of the piezoelectric cable.

Turning first to the Compression Rate Signal Processing Circuit, the input signal from the transducer passes through the normally closed contacts of the switch 156 controlled by the CAL. pushbutton on the control panel. From the switch 156, the signal passes to the wiper arm 190 of a single pole-double throw switch controlled by the FILTER slideswitch 162 on the unit control panel. The switch 162 additionally controls a second single poledouble throw contact arm 192, the contact arms 190 and 192 being selectively actuable to connect a low pass filter circuit 194 into the input circuit path from the transducer for the purpose of removing all noise and other spurious signals outside of the primary signal band of approximately 0–300 Hz. As noted above, the filter 194 is optional and need not be used unless the transducer output signal exhibits a high level of unwanted high frequency component.

For the purpose of properly interfacing with the load-sensitive piezoelectric output signal, the COMP. RATE channel includes a variable gain input amplifier consisting of an operational amplifier 198 operating in a non-inverting mode. The non-inverting input terminal (+) of the amplifier 198 receives its input signal through a pair of voltage dividing input resistors 200 and 202 and an input series resistor 204. A zener diode 206 acts as a reference voltage clamp to prevent spurious voltage spikes of an inordinately high magnitude from affecting the amplifier 198. Gain or sensitivity for the amplifier 198 is controlled by a plurality of feedback resistors 208, 210 and 212, respectively, selected for the negative feedback circuit of the amplifier 198 by the SENSIT. slideswitch 152 on the faceplate of the analyzer. The output of the amplifier 198 passes through a diode 214 prior to being fed back through the resistors 208, 210 or 212. The diode 214 serves to limit current flow from the output of amplifier 198 to the forward direction only.

In accordance with an important aspect of the present invention means are provided for storing the compression rate signal to allow the operator time to record the value of the signal. To this end a storage network 220 is selectively coupled to the output of the unidirectional amplifier 198 by the function selector switch 142 located on the operator's panel. The storage network includes a charging capacitor 222 coupled to ground and a discharge network connected in parallel with the capacitor 222 and including a resistor 224 of low value and the normally open reset (RST) pushbutton switch 148 located on the control panel.

In order to manifest to the operator the maximum compression rate signal stored on the capacitor 222, a digital readout circuit is provided which consists of an A to D converter 226 for quantizing the signal and a driver and display circuit 228 which may be any of a plurality of known types capable of providing a numerical readout on the indicator 140. The A to D converter 226 serves to convert the output voltage signal from the storage network 220 to a numerically coded signal capable of being read on the numerical display 140. The "signal" may appear serially on a single output lead or as a parallel combination of binary digits on multiple lines provided for the respective digits. A pair of switches 230 and 232 at the input and output respectively of the storage network 220 serve to complete the circuit by assuming the closed position whenever the toggle lever 142 on the control panel is in the COMP. RATE position. The switch 142 additionally controls the actuation of one or the other of the pair of indicator lamps 144 or 146 designated, respectively, RPMX10 and COMP. RATE on the control panel. As shown in FIG. 5, the RPMX10 indicator lamp 144 is connected between the positive supply and ground potentials in series with a single pole-single throw switch 240 which is closed whenever the function switch 142 is in the RPMX10 position. Similarly the COMP. RATE indicator lamp 146 is connected between the positive supply and ground potentials in series with a single pole-single throw switch 242 which is closed whenever the toggle lever 142 on the control panel is in its lower or COMP. RATE position.

Summarizing the operation of the COMP. RATE circuit, the transducer output signal, either filtered or unfiltered, is presented to the input voltage divider consisting of resistors 200 and 202. The resistors 200 and 202 are of a high value, typically in the range of 1 megohm or more so as to minimize loading on the piezoelectric element. The amplifier 198 passes the positive going portion of the transducer signal at a gain determined by the ratio of the feedback resistance to the input resistor 204, but due to the diode 214 the negative portion of the input signal from the transducer is inhibited. With the switch 230 closed the amplified positive half of the transducer signal rapidly charges the storage capacitor 222 to the peak magnitude of the scaled compression rate signal from the transducer. Discharge of the capacitor 222 is effectively prevented by the diode 214, which has a very high reverse impedance. As such, the capacitor 222 serves to hold a voltage corresponding to the maximum level achieved by the compression rate signal. This value is continuously monitored by the A to D converter circuit and manifested on the display 140 during operation in the COMP. RATE mode. Of course, the A to D circuit 226 is chosen to have a very high imput impedance so as to prevent discharge of the capacitor 222 therethrough. Once the quantized compression rate signal is read and recorded from the display 140 at a selected speed, the capacitor 222 may be discharged by depression of the RST pushbutton 148, which closes a low impedance path around the capacitor 222 through the low resistance 224.

As thus far described, the COMP. RATE processing channel serves to store on the capacitor 222 a voltage corresponding to the maximum value of the transducer output signal at any given time after actuation of the RST pushbutton 148. A number corresponding to this maximum value is, accordingly, continuously displayed on the readout indicators 140, a slight reduction in the reading over a long time period being possible as a result of internal leakage of the capacitor 222 and slight leakage through the very high impedance components that flank the capacitor 222 in the circuit.

Turning now to the lower channel or tachometer portion of the circuit of FIG. 5, the input signal from the transducer T, either filtered or unfiltered, is coupled to an operational amplifier 250 which acts as a high gain (open-loop) differential comparator. The reference voltage for the inverting input terminal of the amplifier 250 is supplied through a resistor 252 from the output of the unidirectional amplifier 198. The reference for the amplifier 250 is taken from this point to ensure that the amplifier 250 is only driven to a positive voltage output when the transducer signal exceeds a certain percentage of its peak average magnitude, it being presumed that the noise level of the transducer signal will not exceed that certain percentage of the peak value. As an example, to facilitate selection of a 50% threshold, the voltage dividing resistors 200 and 202 at the input of the amplifier 198 are typically made equal in value and the feedback resistor 208, 210 or 212 is chosen to be equal to the input resistor 204 so as to make the amplifier 198 essentially a unity gain amplifier. The diode 214 at the output of the amplifier 198 serves to make the amplifier operate only in the forward direction and the averaging function is performed by a parallel RC circuit consisting of a capacitor 256 and a resistor 258 referenced to ground potential. The time constant of the RC network 256 and 258 is chosen to be much faster than that of the storage network 220 by selection of a much smaller value for the capacitor 256 so that during the RPMX10 mode when the switch 230 is open, the reference voltage for the inverting input of the amplifier 250 can track up and down closely with changes in the magnitude of the transducer signal.

The non-inverting input terminal of the operational amplifier 250 receives the transducer signal, filtered or unfiltered, through an input network consisting of a series resistor 262 and a shunt resistor 264 referenced to ground. A zener diode 266 in parallel with the resistor 264 prevents excessive voltage swings from occurring at the input to the amplifier 250.

The operational amplifier 250 is biased in an open loop (i.e., no feedback) configuration and has extremely high gain. Thus, as the transducer signal at its noninverting input terminal (+) exceeds the voltage level at its inverting input (−) the output of the amplifier rises sharply toward the positive supply voltage.

For converting the output pulses from the amplifier 250 to an analog voltage level indicative of the frequency of those pulses the TACH circuit further includes a monostable multivibrator 270 and an integrator circuit 272. The monostable multivibrator 270 receives the output pulses from the amplifier 250 at its input terminals via a series resistor 274 and generates a pulse of constant width, typically of approximately 15 to 20 milliseconds, at the beginning or rising edge of each output pulse from the amplifier 250. This output pulse is positive-going with respect to ground and appears at the output Q of the monostable circuit 270.

The inversion of this constant width pulse appears at the $\overline{Q}$ output of the monostable circuit 270 and is used to inhibit the input S of the monostable circuit during the period of the monostable so as to prevent false triggering from noise or spurious spikes that may occur at the output of the amplifier 250. To this end, the $\overline{Q}$ output is coupled to the base of a PNP type transistor 276 through a series resistor 278. The emitter of the transistor 276 is connected to the positive DC supply and the collector is coupled to ground through a dropping resistor 280. The output from the transistor 276 is taken from the collector thereof and is coupled to the S input terminal of the monostable circuit 270 through a diode 282. As thus connected, the transistor 276 is biased into conduction whenever the $\overline{Q}$ output of the monostable circuit 270 is at a low potential, thus clamping the input S of the monostable to a high voltage and inhibiting false triggering during the period of the pulse at the Q output of the circuit.

The integrator circuit 272 has an RC input network consisting of a series resistor 286 and a shunt capacitor 288 coupled to ground. An operational amplifier 290 receives the input signal from the RC network at its non-inverting input terminal 291 and acts as a unity gain buffer by virtue of a direct feedback line 292 from its output back to its inverting (−) input. The output of the amplifier 290 is in turn connected to a second RC network consisting of a series resistor 294 and a capacitor 296 referenced to ground. The capacitor 296 is of a relatively high value compared to the capacitor 288 and acts as an integrator, the charging rate of the capacitor being governed by the series resistor 294 while its discharge is governed by a series resistive network consisting of a fixed resistor 297 and a variable resistor 298 connected in parallel with the capacitor 296.

The value of the resistor 294 is chosen such that the voltage across the capacitor 296 can track normal increases in the speed of the engine being monitored. The discharge network of resistors 297 and 298, in turn, control the level to which the capacitor voltage rises for a given speed. For this reason the variable resistor 298 functions as a calibrating resistor under the control of the calibration control 158 on the face of the control panel.

During operation in the RPMX10 (TACH) mode, the voltage developed across the capacitor 296 is proportional to the frequency of the transducer signal and hence to engine speed. During this mode, this voltage is coupled through the switch 232 to the analog to digital converter 226 where it is quantized to produce a binary coded numerical signal corresponding in numerical value to the voltage across the capacitor 296 and, hence, to speed. This, in turn, effects a reading on the panel display 140 which is indicative of engine speed.

It will be appreciated that the tachometer portion of the system of FIG. 5 may be any of a variety of configurations without deviating from the scope of the present invention and may, for example, be of the type disclosed in pending application Ser. No. 913,826 filed June 8, 1976 and assigned to Creative Tool. In addition, the tachometer circuit may be digital in nature and thus avoid the use of the analog integrator circuit 272. This, in turn, eliminates the need for the calibration oscillator on the panel control 158, thus simplifying the use of this device for the serviceman.

It will be appreciated, of course, that the apparatus and methods of the present invention will often be employed by service personnel who have a minimum amount of training, and as a result, simplicity of operation is an important feature of the present invention. The alternate embodiment of FIG. 6 has features which even further simplify the use of the invention by the serviceman. In this embodiment, means are provided for displaying the compression rate number and corresponding engine speeds simultaneously to simplify the recording function. This eliminates the need for the mode switch 142 and associated indicator lights 144 and 146 on the control panel. In addition, the embodiment of FIG. 6 utilizes a digital tachometer circuit, thus eliminating the need for the calibration adjustment 158 and pushbutton 156 on the control panel. A still further simplification is achieved by incorporating the low pass filter 194 shown in FIG. 5 as a standard component of the circuit, thus eliminating the need for the panel slide-switch 162 shown in FIGS. 1 and 5. It will be appreciated, however, that the option of filtering or non-filtering may be employed in either of the systems shown in FIGS. 5 and 6.

Figure 6:
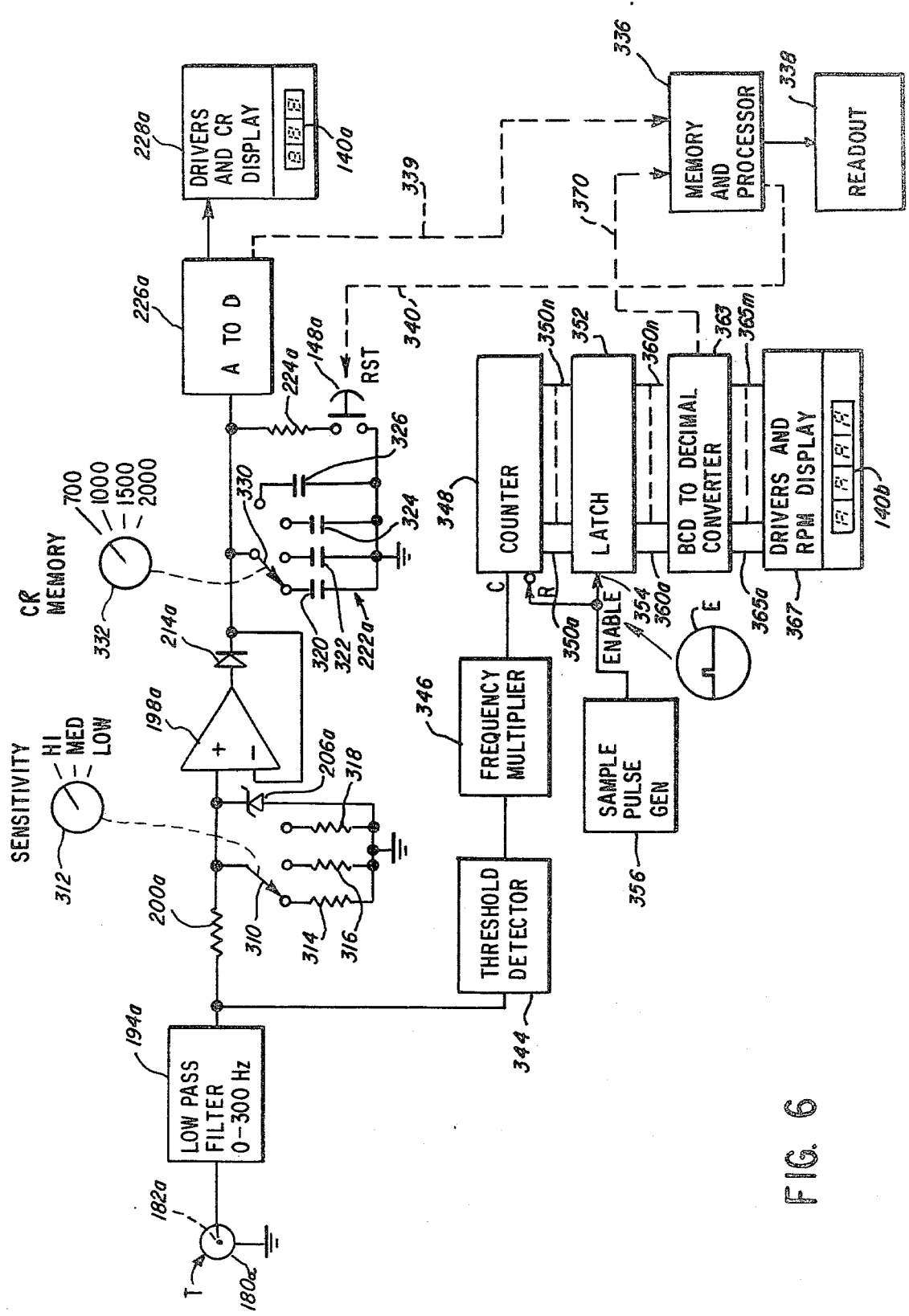
FIG. 6 is a circuit diagram, partially in block form, of various alternative approaches and options to the system shown in FIG. 5.

In an effort to further simplify the use of the system the embodiment of FIG. 6 includes a plurality of storage devices which allow the operator to store a voltage or number corresponding to the compression rate amplitude at each of a plurality of preselected speeds plus means for sequentially recalling or displaying the compression rate numbers for those selected speeds at the completion of a test cycle on a given cylinder. Finally, alternate memory and readout means are provided as an option in the system of FIG. 6 for use in more sophisticated or laboratory operations where long term storage and/or bulk storage is desirable and where printouts, or graphical compression rate curves are preferred.

Referring more specifically to the structure shown in FIG. 6, it is noted that functional elements which operate in the manner described in FIG. 5 are referenced with the numbers of FIG. 5 plus the suffix "a", and will not be rigorously described below. Suffice to say that the filtered positive half cycle from the compression rate signal taken from the transducer T is applied simultaneously to both an upper channel for developing a numerical indication of compression rate and a lower channel for measuring the speed of the engine in a digital manner. Turning first to the upper channel, an alternate form of a sensitivity or gain control is utilized at the input of the operational amplifier 198a. A three position switch including a wiper arm 310 controlled by a panel control knob 312 is provided in series with a selected one of a group of resistors 314, 316 and 318 referenced to ground. Depending on the choice of resistors made by the operator via the control knob 312, the signal reaching the noninverting input terminal of the amplifier 198a may be greater or less, as desired, to ensure that operation of the system throughout the test is within the limits of the output display. The operational amplifier 198a is shown in a unity-gain configuration, although it will be appreciated that gain may be added to the system, as desired, by providing resistors in series with the non-inverting input terminal (+) and in the feedback line between the cathode of the diode 214a and the inverting input terminal (−), the gain being dependent upon the ratio of the feedback resistor to the input resistor. Due to the high reverse impedance of the steering diode 214a, the maximum voltage achieved at the output of the amplifier 198a during the positive half cycle of the transducer output signal is stored in the capacitor circuit 222a until discharge is effected by the reset button designated 148a and provided on the control panel.

For the purpose of providing the operator with storage capability, the capacitor 222 shown in FIG. 5 is replaced in the present embodiment of FIG. 6 by a plurality of capacitors 320, 322, 324 and 326 which are of relatively high value (typically 100 microfarads) to provide long persistence and low leakage for the signals being stored. Selection from among these capacitors for operation in the circuit is achieved via a four position rotary switch which includes a wiper arm 330 under the control of a panel knob 332. The knob 332 is designated CR MEMORY and includes positions for various speeds (RPM) at which the scaled compression rate signal is to be measured and stored. In a typical operating sequence, the operator progressively raises the speed of the engine and monitors that speed through the tachometer readout to be described. As he reaches each of the storage speeds 700, 1000, 1500 and 2000 RPM respectively, he switches the wiper arm 330 from one position to the next thus leaving on the previously operative capacitor a voltage corresponding to the maximum compression rate achieved at the time that capacitor was last connected in the circuit. The reset button 148a may be used by the operator at each of the aforesaid sampling speeds to momentarily discharge the operative capacitor from among the group 320, 322, 324 and 326 to ensure that the maximum compression rate signal is stored only when the speed is stabilized at the selected level and that a value has not been stored that may have resulted from a temporary overshoot of the selected speed, it being recalled that the voltage stored in the capacitor bank 228 can only track the compression rate in a positive direction and will only increase until the RST button 148a is pushed.

As noted above, for more sophisticated and demanding diagnosis, the compression rate channel may include, in lieu of the analog storage bank consisting of the capacitor 222a, a digital memory and microprocessor circuit 336 coupled with an appropriate readout device 338. The memory 336 preferably receives the compression rate signal after it has been converted to a numerically coded binary number at the output of the A to D converter 226a via one or more data lines functionally represented by a broken line 339. Depending upon the size and complexity of the memory and microprocessor circuit 336, successive values for both the quantized maximum compression rate and the quantized corresponding speeds can be recorded at any desired interval. It is desirable during bidirectional operation to reset the capacitive storage bank 222a, which is typically a single capacitor when used with the digital memory 336, upon the completion of each recording operation by the memory and processor circuit 336. The resetting of the aforesaid capacitive storage device is functionally denoted by a broken line 340 operating upon the RST button 148a under the control of the memory and processor, although it will be appreciated that resetting of the capacitive device is preferably accomplished by a solid state switch connected in parallel with the capacitive storage device 222 or 222a and adapted to be closed by an appropriate digital signal or pulse developed by the memory and processor circuit 336 at the end of its storage function.

The lower portion of FIG. 6 illustrates a digital tachometer circuit which may be used in lieu of the combination analog-digital circuit shown in FIG. 5. The filtered transducer pulses are fed to a threshold detector 344 which serves to create an output pulse only for those portions of the transducer pulses which exceed a predetermined level above the ambient noise. Since the signals developed from the transducer are of relatively low frequency, a frequency multiplier 346 is provided at the output of the threshold detector to provide a train of pulses which occur at a rate proportional to the transducer output signal but at a rate which is preferably several orders of magnitude in excess of that of the transducer pulses. Any of a variety of circuits known to the art may be used for the frequency multiplier 346, one example being a voltage controlled oscillator driven by a frequency to voltage converter. The frequency-multiplied transducer pulses are then fed to a counter 348 in serial fashion via the clock input C thereto. The counter 348 may be any of a plurality of commonly available digital counters of the ripple or other type having a terminal provided for resetting the counter to zero in response to an applied pulse. The counter 348 is typically a multistage device having a plurality of parallel outputs 350a–n which register a number in binary coded decimal form. For the purpose of selectively sampling the number in the counter and storing that number for readout purposes, a multistage latch circuit 352 is provided. The latch circuit 352 has successive memory stages corresponding to the outputs from the counter 348 and is adapted to accept and hold the binary digits from the counter 348 in those latch stages upon the rising edge of a pulse applied to an input 354 designated ENABLE. The pulse to the ENABLE input 354 of the latch circuit 352 is provided by a sample pulse generator 356 which operates at a constant frequency to produce a narrow pulse shown in a circle E. The output pulse from the sample pulse generator 356 is also applied to the reset terminal R of the counter 348, the small circle at the reset terminal R signifying that the counter is reset on the trailing edge of the sample pulse from the generator 356. The width of the sample pulse, as shown in a circle E, is preferably less than the minimum period between pulses from the frequency multiplier 346 so that sampling by the latch 352 and resetting of the counter 348 can occur without significantly affecting the accuracy of the counting function. The duration between successive pulses from the sample pulse generator 356 is established such that the binary coded decimal (BCD) number accumulated by the counter 348 prior to sampling corresponds to the speed or RPM of the engine at all times. The choice of multipliers for the frequency multiplier circuit 346 and the size of the counter 348 is governed by the same consideration. The higher the multiplier chosen for the circuit 346, the faster sampling by the latch circuit 352 may occur. The output of the latch circuit 352 is provided on the series of lines 360a–n which in turn are coupled through a BCD-to-decimal converter circuit 363 which may be any of a variety of circuits commercially available for this function. The output of the converter circuit 363, in turn, is provided on a series of lines 365a through 365m which are coupled to a suitable driver and RPM display circuit 367. The circuit 367 illuminates a plurality of numerical readout elements 140b provided on the face of the control panel to indicate to the operator the then existing speed of the engine. The suffixes n and m for the output lines 350, 360 and 365 are used to signify that the number of lines in each instance is variable depending upon the size of the chosen counter 348, latch 352 and converter circuits 363.

For the reasons discussed above, the speed-indicative digital number in the BCD to decimal converter circuit 363 is also applied to the memory and processor circuit 336 in the instance where the digital memory and readout units 336 and 338 are utilized. This optional connection is functionally depicted by a broken line 370 from the converter circuit 363 to the memory and processor circuit 336. Depending upon the type of circuits chosen for this function, the speed-related information for the memory and processor circuit 336 may also be taken from the output of the latch device 352 rather than the converter circuit 363.

Briefly summarizing operation of the digital tachometer circuit, low frequency pulses from the transducer T pass through the filter 194a to the threshold detector 344 and create a pulse train which is still at relatively low frequency. This pulse train is multiplied in frequency by several orders of magnitude by the multiplier 346 and thereafter applied to the counter circuit 348. At preselected intervals, a narrow pulse is generated by the circuit 356 which first enables the latch circuit 352 to register the number then contained in the counter 348. At the falling edge of the sample pulse from the circuit 356 the counter is reset to zero, with the last registered count being stored in the latch circuit 352. The number in the latch circuit 352 is continuously converted to decimal notation by the circuit 363 and displayed on the readout 140b, that number being successively updated upon the occurrence of each sample pulse from the circuit 356.

MONITORING AND DIAGNOSTIC METHODS

The memory and processor circuit 336 stores a plurality of quantized compression rates for various speeds of the engine. The readout circuit 338 may, for example, be in the form of a printer capable of printing out the quantized compression rates in a serial form with their corresponding speeds or in a graph form with speed as the abscissa and quantized compression rate as the ordinate. The processor 336 may also be used to compute ratios of one quantized compression rate number to another and to read out or graph those ratios automatically. By comparing the quantized compression rate numbers obtained at given speeds from different cylinders, the microprocessor may be used to print out or otherwise indicate through the readout device 338 deviations from the norm by each cylinder, or in less demanding environments, to provide a fault indication (a light, buzzer or the like) to the operator whenever the compression rate for a given cylinder deviates from the norm by more than a predetermined amount.

The quantized compression rate signals and readout developed by the system may also be used as an onboard monitoring device installed in the vehicle dash and used in a manner similar to a vaccuum gauge or the like.

In utilizing the analyzer it has been found that the compression rate signal taken from the transducers herein disclosed increases in amplitude as the temperature of the engine increases. This phenomenon can be readily ascertained with the apparatus herein described and monitoring of this increase is useful in analyzing overall engine performance, fuel economy and emissions during warm-up conditions, since it is known that fuel flow, atomization and actual cylinder pressure all vary with temperature during warm-up. Thus the analyzer of the present invention may be used, for example, to monitor the manner in which changes in fuel content, humidity and other external factors affect the engine during warm-up.

For most other diagnostic purposes, however, it is recommended that the engine be operated until warmup is completed and the temperature has stabilized throughout the compression head.

Before discussing the methods of utilizing the analyzer in detail, it is noted again that the terms "compression rate" or "compression rate signal" as used herein refer to the output or output signals of the type produced by certain piezoelectric transducers when coupled to or used in place of various engine components which extend into the cylinder combustion chamber. This signal, at least for frequencies in the range of normal engine speeds, exhibits the characteristics of the first derivative or time-rate-of-change of the actual pressure within the observed engine cylinder. As such, it does not reflect the steady state pressure to which it is subjected in its attachment to the engine but rather is reflective of the manner in which pressure changes within the cylinder. The terms "quantizing" or "quantized" as used herein are used in their conventional sense to denote the conversion of a physical attribute the amplitude or magnitude of a signal into a corresponding numerical value.

A malfunction occurring in one or more cylinders is detected by comparing the compression rate readings taken from each of the cylinders by the same transducer during normal operation of the engine at a given speed. A reading lower than the norm by 15% or more is indicative of a malfunction in the corresponding cylinder. If the misfiring or other engine problem manifests itself only at elevated engine speeds, the operator may record the pressure rate of change readings from each of the cylinders at a plurality of predetermined speeds. Again, the faulty cylinder is located by comparing the readings taken from each cylinder to the norm.

Once the suspect cylinder or cylinders has been located, the problem with that cylinder may be further diagnosed by various methods. A second set of readings of the quantized compression rate, as measured by the same transducer attached to the cylinder, can be taken with the fuel line for that cylinder disconnected at the injector nozzle or at the injector pump. If the quantized compression rate reading at a given speed is not significantly lower than it was at the same speed with the fuel line connected, the combustion component of the transducer signal is not present and the injector nozzle is likely to be at fault and should be repaired or replaced.

If the quantized compression rate reading for the suspected cylinder with the fuel line disconnected does not conform to the reading obtained with the fuel line connected, the fuel line for a second cylinder is disconnected and the transducer is moved to that second cylinder. Readings of the quantized compression rate for the second cylinder are then taken at the same speeds as for the suspect cylinder. If, at given identical speeds, the readings for both cylinders with the fuel lines disconnected are approximately the same, then the variation in compression rate readings between the two cylinders in normal operation with the fuel system attached can be attributed to the faulty injector system for the suspect cylinder.

If, on the other hand, the compression rate readings for the suspect cylinder fall substantially below those for other cylinders when the fuel lines for each are disconnected, then the malfunction of the suspect cylinder can be attributed to cylinder components other than the injector system, such as the valves, rings, piston, etc. Although an overhaul may be dictated by this finding, that overhaul may be limited to the suspect cylinder, thus effecting a substantial saving in time and expense.

In carbureted engines another method of diagnosing faults is available with the present invention. First, the compression rate for each cylinder may be taken from the same plug transducer of the type disclosed in U.S. application Ser. No. 007,347 while the distributor lead to each plug is connected. This is done by loosening or removing each plug in succession and retightening the plug into position with the transducer attached. Compression rate readings from all cylinders are recorded for one or more preselected speeds. A reading lower than the norm by 15% or more signals a malfunction in the cylinder producing that reading.

Further isolation of the problem within that cylinder can be achieved by disconnecting the spark plug line to that cylinder and taking the compression rate readings for that cylinder at the same speeds as before. If the compression rates are substantially the same before and after removal of the plug wire, the malfunction is at least partially due to a fouled or faulty spark plug or to the electrical distribution system. Replacement of that plug, and/or its associated distributor wire is dictated.

If the compression rate readings for the suspected cylinder are substantially lower after removal of the spark plug wire than before its removal, then the plug can be considered at least partially operative and a further comparison may be desirable. The spark plug wires for the suspect plug and a second, and preferably normal, plug are removed in succession and compression rate readings for each of the cylinders are taken from the same transducer at the same speeds. Significant variations of the compression rate signals under this no-firing condition are indicative of non-electrical malfunctions in the cylinder providing the lower readings, such malfunctions being attributable to bad rings, valves, pistons or the like.

As with the diesel engine diagnosis procedures, the compression rates for the various cylinders of the carbureted engine are preferably recorded and compared for a plurality of engine speeds, since the malfunctions associated with carbureted engines often manifest themselves in only a portion of the speed range.

When it is known that the points and plugs of a carbureted engine are new or properly functioning, another important test may be conducted. Each of the cylinders are monitored for compression rate at the same speeds but with the spark plug disconnected for each of the cylinders during monitoring of that cylinder. The compression rate readings are recorded and compared to determine, from abnormally low readings, the malfunctioning cylinder or cylinders. This test effectively confines the diagnosis to non-electrical problems.

Still a further method of diagnosis is possible with the apparatus of the present invention. In some engines the nozzles or glow plugs are hard to reach or are irregular in other manners due to their location, size, seating surface or the like. In other engines the same approximate torque cannot be applied to the transducer when it is applied to each of the cylinders. To eliminate erroneous readings that may result from such variations in the manner in which the transducer is attached, the operator, for each cylinder, first records the compression rate for one or more speeds (typically 700, 1000, 1500 and 2000 RMP) with the fuel line to the injector nozzle for that cylinder disconnected. Before moving to the next cylinder, however, the compression rate readings at the same speeds are taken with the fuel line reconnected (or spark plug wire reconnected in the carbureted engine). The ratio of compression rate without injection to compression rate with injection, $CR_w/CR_i$, is calculated for each of the various speeds and compared cylinder to cylinder. Again, a deviation in this ratio from the norm by more than 10–15% is indicative of a malfunctioning cylinder. Since the absolute value of both the numerator and denominator of this ratio are equally affected by the manner in which the transducer is coupled to the cylinder, the variations in this ratio from cylinder to cylinder are attributable solely to the performance or failures of the injector system. Those cylinders for which this ratio deviates substantially from the norm are thus isolated as probably malfunctioning and corrections can be made to the fuel carrying components for that cylinder.

As still a further testing technique, the compression rate numbers for one or more cylinders may be monitored at cranking speed with the fuel pump, and hence the entire injection system, disabled. This test may be conducted by itself or in conjunction with one or more of the methods disclosed above.

If this test is to be performed alone, the same transducer is preferably moved from cylinder to cylinder. Readings of compression rate are taken from each cylinder with the temperature of the engine at or substantially near the same level in each instance. This can be done with the engine cold, but in most instances the engine will have been warmed to normal operating temperature and stabilized. The latter condition is preferable since cranking speed is more likely to remain constant if the electrical system is fully charged, a condition which is more likely to exist in a fully warmed-up engine.

The compression rate numbers taken in this manner with the fuel system inoperative, by themselves, depict the condition of the cylinder components other than the fuel system. For a properly functioning engine, these cranking speed compression rate numbers have been found to be essentially constant from cylinder to cylinder. If the same engine is then monitored for compression rate numbers at operating speeds with the fuel system operative, significant deviations from the norm by the compression rate numbers for any one or more cylinders are attributed solely to fuel system problems for those cylinders and appropriate repairs can be made to the injection system.

From the foregoing it is seen that there has been brought to the art a method and apparatus for monitoring the performance of internal combustion engines in a manner heretofore not achieved. Since the signal derived from the transducers disclosed varies in accordance with the first derivative or time-rate-of-change of the actual pressure within the cylinder being monitored, the system essentially ignores minor variations in initial, or steady state, conditions such as may result from variations in the tightness with which the transducer is secured to the cylinder components. As such, the system is applicable to a wide variety of engine types and sizes with but little modifications, and minimal skill is required on the part of the operator. The system is particularly useful in diagnosing faulty injection components in diesel engines, thus effecting substantial savings in fuel, increases in power and a reduction in emission levels.

What is claimed is:

1. Apparatus for monitoring the performance of fuel injected internal combustion engines of the type having injection nozzles extending into the respective engine cylinders, said apparatus comprising transducer means adapted to be coupled to a selected one of said injector nozzles and capable of producing a first signal which varies substantially in accordance with the time-rate-of-change of the pressure exerted on said selected nozzle from within said cylinder, circuit means responsive to said transducer output signal for developing a second electrical signal the amplitude of which corresponds to the maximum amplitude of said transducer output signal, signal conversion means coupled to said circuit means for producing a numerically coded electrical representation of said second electrical signal, first readout means for manifesting said numerically coded electrical representation to the operator as a visual indication of the performance of said selected engine cylinder, a tachometer circuit coupled to said transducer means and adapted to produce at least one third electrical signal which varies in accordance with the primary frequency of said transducer signal, and second readout means driven by said tachometer circuit for manifesting to the operator a numerical value corresponding to the magnitude of said speed-related signal as an indication of engine speed.

2. The apparatus according to claim 1 for monitoring the performance of fuel injected internal combustion engines wherein said first and second readout means include a common visual indicator and wherein said apparatus further includes means for selectively coupling said common visual indicator to be driven by either said signal conversion means or said tachometer circuit.

3. The apparatus according to claim 1 wherein said first and second readout means have separate visual indicators to allow the operator to simultaneously monitor engine speed and said numerically coded representation of said second electrical signal.

4. Apparatus for monitoring the performance of internal combustion engines of the type having a plurality of cylinders and at least one receptacle extending from each of said cylinders to the exterior of said engine, said receptacle being adapted to sealingly engage a combustion-aiding device such as a fuel injection nozzle, spark plug or glow plug, transducer means adapted to be coupled to the combustion-aiding device of at least one of said cylinders and capable of producing a signal which varies substantially in accordance with the first derivative of the pressure exerted on said combustion-aiding device from within said cylinder, first circuit means coupled to said transducer for quantizing the maximum amplitude of the transducer output signal and producing a first numerically coded electrical representation indicative of said maximum amplitude, second circuit means coupled to said transducer for measuring the primary frequency of said transducer output signal and producing a second numerically coded electrical representation indicative of engine speed, and readout means associated with said first and second circuit means for displaying a number corresponding to at least one of said first or second numerically coded electrical representations.

5. Apparatus according to claim 4 for monitoring the performance of fuel injected internal combustion engines wherein said readout means is a numerical display device coupled to said first and second circuit means and adapted simultaneously manifest said first and second numerically coded representations.

6. Apparatus according to claim 5 for monitoring the performance of fuel injected internal combustion engines further including an output indicator associated with said manual control means for manifesting to the operator which of said first or second numerically coded electrical representation is being displayed on said readout means.

7. Apparatus according to claim 4 for monitoring the performance of fuel injected internal combustion engines wherein said readout means is a numerical display and said apparatus further includes manual control means for allowing the operator to selectively couple said first or second numerically coded electrical representation to said readout device.

8. Apparatus according to claim 4 for monitoring the performance of internal combustion engines further including reset means associated with said first circuit means for initiating said quantizing of said transducer signal at a selected time.

9. Apparatus according to claim 8 for monitoring the performance of internal combustion engines wherein said reset means includes a manual control to allow the operator to initiate the quantizing of said transducer signal.

10. Apparatus for monitoring the performance of internal combustion engines of the type having a plurality of cylinders and at least one receptacle extending from each of said cylinders to the exterior of said engine, said receptacle being adapted to sealingly engage a combustion-aiding device such as a fuel injection nozzle, spark plug or glow plug, transducer means adapted to be coupled to the combustion-aiding device of at least one of said cylinders and capable of producing a signal which varies substantially in accordance with the first derivative of the pressure exerted on said combustion-aiding device from within said cylinder, first circuit means coupled to said transducer for quantizing the maximum amplitude of the transducer output signal and producing a first numerically coded electrical representation indicative of said maximum amplitude, second circuit means coupled to said transducer for measuring the primary frequency of said transducer output signal and producing a second numerically coded electrical representation indicative of engine speed, selectively controlled memory means coupled to said first and second circuit means for storing said first and second numerically coded electrical representation at selected intervals of engine speed.

11. Apparatus according to claim 10 for monitoring the performance of fuel injected internal combustion engines, said apparatus further including readout means coupled to said selectively controlled memory means for displaying a value corresponding to at least one of the stored combinations of said first and second numerically coded electrical representations.

12. Apparatus according to claim 10 for monitoring the performance of fuel injected internal combustion engines, said apparatus further including readout means coupled to said selectively controlled memory means for manifesting simultaneously a plurality of values corresponding respectively to a plurality of the stored combinations of said first and second binary coded electrical representations.

13. Apparatus according to claim 12 for monitoring the performance of fuel injected internal combustion engines wherein said readout means is a printer and said plurality of values manifested are in the form of a graph of the quantized maximum values of said transducer output signal at a plurality of predetermined speeds.

14. An instrument for monitoring the performance of the respective cylinders of an internal combustion engine from a transducer whose output signal varies substantially in accordance with the first derivative of the pressure occurring within a chosen cylinder to which the transducer is coupled, said instrument comprising
   a quantizing circuit coupled to receive said transducer output signal and adapted to produce a first numerically coded signal of a value corresponding to the magnitude of said transducer output signal,
   a tachometer circuit coupled to receive said transducer output signal and adapted to produce a second numerically coded signal of a value corresponding to the frequency of the oscillations of said transducer output signal resulting from repetitive combustion within said chosen cylinder, and
   means for simultaneously monitoring said first and second numerically coded signals and manifesting the numerical magnitude of said signals.

15. An instrument in accordance with claim 14 for monitoring the performance of the respective cylinders of an internal combustion engine wherein said tachometer circuit includes
   frequency multiplying means for receiving said transducer output signal and producing a train of pulses at a frequency substantially greater than but proportional to the frequency of combustion within said chosen cylinder,
   counter means for repetitively measuring the number of said pulses from said multiplying means occurring during a preselected constant interval of time, and
   means for monitoring the measured number of pulses at the conclusion of each interval of time and displaying a value corresponding to said number as an indication of engine speed.

16. An instrument in accordance with claim 15 for monitoring the performance of the respective cylinders of an internal combustion engine wherein said means for measuring the pulses in said pulse train includes a counter for receiving said pulses, a latch circuit selectively coupled to said counter to receive the number recorded therein and an oscillator for producing a signal at the end of each of said intervals which is operative to transfer the accumulated number in said counter to said latch circuit and to thereafter reset said counter to its initial value to begin the next measured interval.

17. A method for monitoring the performance of an internal combustion engine comprising the steps of
   attaching a piezoelectric transducer to a selected cylinder to develop a signal corresponding substantially to the first derivative of the pressure within the selected cylinder,
   electrically quantizing the magnitude of said transducer signal to obtain a numerical manifestation of said transducer output signal as a measure of the performance of said selected cylinder.

18. The method of claim 17 for monitoring the performance of an internal combustion engine comprising the further step of
   recording successive numerical manifestation of said quantized transducer signal at a plurality of engine temperatures to give an indication of cylinder performance at varying temperatures.

19. The method of claim 18 for monitoring the performance of an internal combustion engine further including the step of quantizing the frequency of said transducer output signal to obtain a numerical manifestation of said frequency as a measure of the speed of said engine.

20. The method of claim 19 for monitoring the performance of an internal combustion engine, said method further comprising storing said numerical manifestations of magnitude and corresponding speed for a plurality of selected engine speeds, and
   generating a visual record showing the relationship of the quantized magnitude of said transducer signal to engine speed.

21. The method of claim 17 for monitoring the performance of an internal combustion engine further comprising the steps of
   operating the engine until the temperature has reached its normal stabilized operating point,
   running the warmed engine at a plurality of engine speeds,
   recording the values of said numerical manifestations of said quantized transducer signal obtained at a succession of speeds as an indication of cylinder performance over said range of successive speeds.

22. The method of claim 17 for monitoring the performance of an internal combustion engine further comprising the steps of
   operating said engine until the temperature has reached its normal stabilized operating point,
   recording the numerical value of said quantized transducer output signal for at least one engine speed,
   moving and attaching said piezoelectric transducer to at least one other cylinder to develop a signal corresponding to the first derivative of the pressure within said other cylinder,
   electrically quantizing the magnitude of said transducer signal from said other cylinder while operating said engine at the same speeds at which values were recorded for said first cylinder to obtain numerical manifestations of the transducer output signal from said other cylinder,
   recording the numerical manifestation from said other cylinder at the same speeds at which recording was accomplished on said first cylinder to give a comparative indication of the performance of each of said cylinders with respect to the other.

23. The method of claim 22 for monitoring the performance of an internal combustion engine further comprising the steps of repeating the steps of claim 22 for each of the cylinders of the engine to obtain recorded numerical manifestations of the performance of each of the cylinders of the engine operating at at least one common speed to signal to the operator any deviation from the norm for a given one or more cylinders.

24. A method for monitoring the performance of a fuel-injected internal combustion engine having an injection delivery system normally delivering fuel to each of the cylinders of said engine, said method consisting essentially of the steps of:

attaching a piezoelectric transducer to a selected cylinder of said engine such that an output signal is developed by said transducer that varies substantially in accordance with the first derivative of the pressure within the selected cylinder, electrically quantizing the magnitude of said transducer output signal to obtain a numerical representation of said magnitude of the transducer signal, operating said engine until it achieves a stabilized normal operating temperature, running the engine to at least one preselected engine speed with the fuel system to said selected cylinder operative so as to obtain a first numerical representation of the quantized transducer signal for said preselected speed, disconnecting the fuel system for said selected cylinder, running the engine at said preselected speed with the fuel system disconnected to develop a second numerical representation of the quantized transducer signal for comparison to said first numerical representation to provide an indication of deviation between said first and second numerical representations indicating the performance of the fuel system for that selected cylinder.

25. The method of claim 24 for monitoring the performance of a fuel injected internal combustion engine, said method further including the steps of repeating each of the steps of claim 15 until said first and second numerical representations have been obtained for at least one additional cylinder so as to provide a comparison between the effects of the fuel injection system for the monitored cylinder.

26. The method of claim 24 for monitoring the performance of a fuel injected internal combustion engine, said method further including the steps of repeating each of the steps of claim 24 until said first and second numerical representations have been obtained for each of the cylinders such that the relative performance of the fuel injection system for each of the cylinders is manifested.

27. A method for diagnosing malfunctions within the cylinders of a diesel engine having a plurality of injection nozzles normally supplying fuel to the respective cylinders of the engine, said method consisting essentially of:

a. bringing the engine to a stabilized operating temperature, b. inhibiting the fuel flow to a selected one of said injector nozzles, c. attaching to said selected nozzle a transducer which develops a signal corresponding substantially to the time-rate-of-change of the pressure within the selected cylinder, d. registering the magnitude of said signal at a predetermined engine speed, e. restoring fuel flow to the nozzle for said selected engine cylinder, f. repeating each of the a-e above on at least one additional cylinder to obtain a plurality of registered values corresponding to the time-rates-of-change of pressure within a plurality of cylinders measured at the same engine speed, and g. comparing said registered values to determine deviations indicative of malfunctions within one or more cylinders.

* * * * *